T. S. CAFFERTY.

MEANS FOR LEVELING AND FINISHING THE SURFACES OF BALLASTED RAILWAY TRACKS.

APPLICATION FILED MAY 13, 1910.

Reissued Jan. 10, 1911.

13,194.

Attest:
Edwd. L. Tolson,
Edward N. Sexton

Inventor:
Theron S. Cafferty,
by Spear, Middleton, Donaldson & Spear
Atty's.

THE NORRIS PETERS CO., WASHINGTON, D. C.

UNITED STATES PATENT OFFICE.

THERON SAMUEL CAFFERTY, OF UNION, NEW YORK.

MEANS FOR LEVELING AND FINISHING THE SURFACES OF BALLASTED RAILWAY-TRACKS.

13,194. Specification of Reissued Letters Patent. Reissued Jan. 10, 1911.

Original No. 912,282, dated February 16, 1909, Serial No. 463,702. Application for reissue filed May 13, 1910. Serial No. 561,272.

*To all whom it may concern:*

Be it known that I, THERON SAMUEL CAFFERTY, citizen of the United States, residing at Union, Broome county, New York, have invented certain new and useful Improvements in Means for Leveling and Finishing the Surfaces of Ballasted Railway-Tracks, of which the following is a specification.

My invention relates to means for leveling and finishing the surface of the ballasting for railway tracks, and it includes means for leveling the ballasting between the tracks and also for forming the shoulder at the outer sides of the rails adjacent the ends of the ties.

The invention consists in the features of construction and combination and arrangement of parts hereinafter described and particularly pointed out in the claims.

Figure 1:
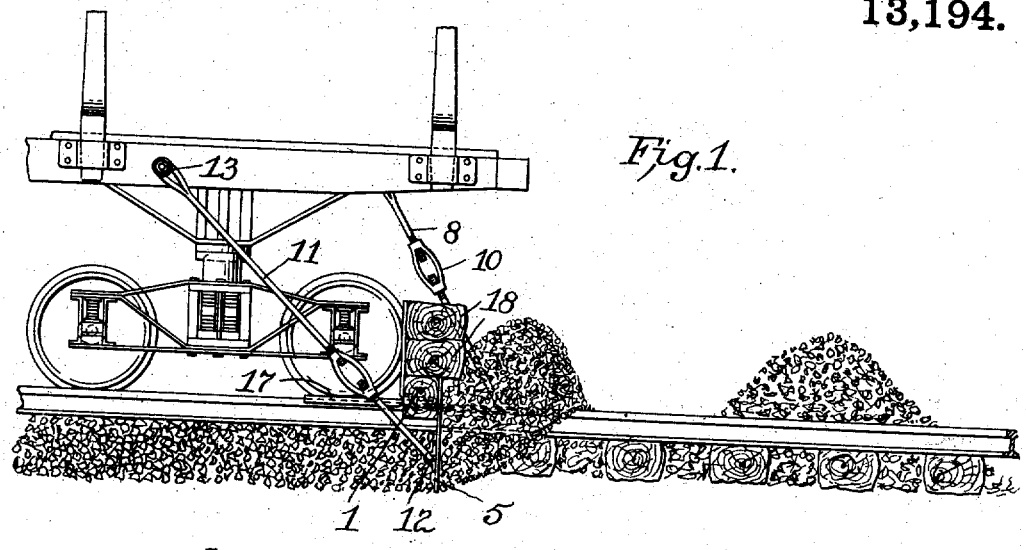
Figure 2:
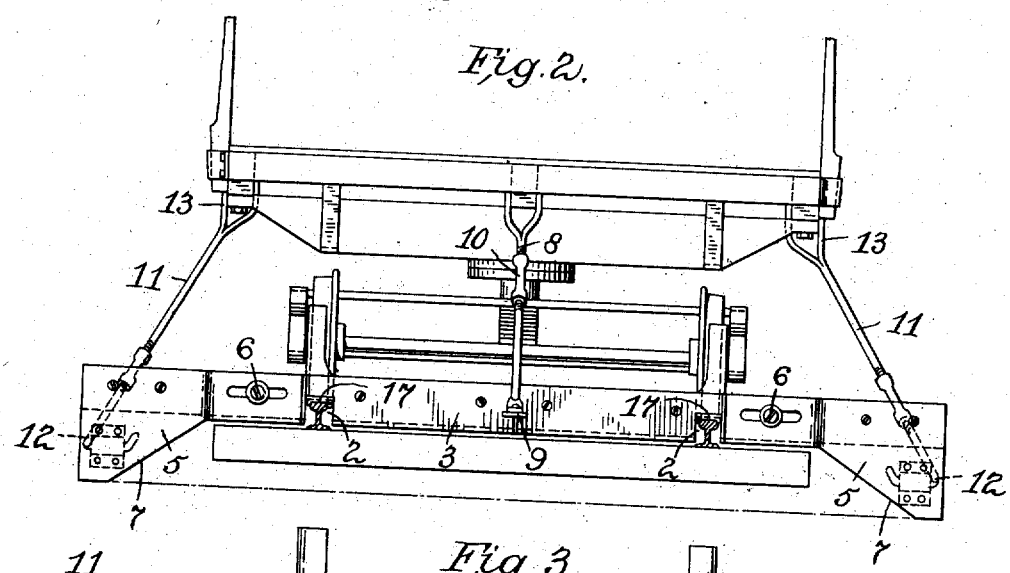
Figure 3:
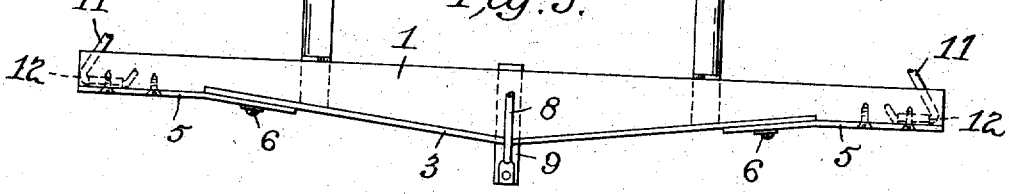
Figure 4:
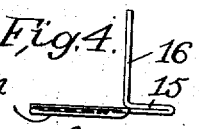

In the accompanying drawings: Figure 1 is a side elevation of a portion of a car or truck with my invention applied thereto; Fig. 2 is a front view of the part shown in Fig. 1; Fig. 3 is a plan view of a portion of my invention, and Fig. 4 is a view of a detail.

The invention includes means adapted to be propelled along the roadbed of a railway track, said means being adapted for attachment to a platform car or locomotive, so as to extend across the roadway with its lower edge below the tread of the rails in order that it may engage the ballasting material, spread and level the same, and direct it to the proper points where it is intended it should be located in relation to the rails.

In carrying out my invention, I employ a beam 1 extending transversely across the rails, notched at 2 to receive the rails, the said beam being provided with a wear plate 3 of metal, this being located on the front face which contacts with the ballasting material to spread the same. The beam tapers from the center laterally, as shown in Fig. 3, so that the ballasting material will be spread and directed laterally toward the rails from the center of the track and over the rails, so as to form the shoulder of the roadbed adjacent the ties. The beam has also attached thereto shoulder forming members consisting preferably of plates 5 of metal secured adjustably, as at 6, to the front face of the cross beam near its ends, this shoulder forming plates having inclined lower edges at 7, the incline of which conforms substantially to the desired incline of the shoulder of the roadbed. The cross beam, together with the shoulder forming plates is supported from a platform car or from a locomotive, and, as an illustration of the application of my invention, I show it in connection with a portion of a platform car. A rod *h* extends from any suitable part of the platform car, such as the draw bar or center beam, but its front end being attached to a plate or extension 9 secured to the cross beam at the center thereof in any suitable manner, and projecting forwardly therefrom. A turn buckle is provided at 10 in this brace or stay rod for adjustment. Other rods 11 are connected, as at 12, to the shoulder forming plates, these rods inclining backwardly and inwardly and being attached, as at 13, to any suitable part of the platform car or other propelling device. The cross beam has also applied thereto a pair of shoes, illustrated in detail in Fig. 4, these shoes having a portion 14 to rest on the rails, a portion 15 for attachment to the cross beam, and an upwardly extending portion 16 immediately in rear of the cross beam. These shoes form rests for the forward wheels of the truck or other propelling device, as at 17. In the operation of the invention, the apparatus is attached to the car as above described, and the car is then propelled along the road, the cross beam engaging the ballasting material, spreading it between the rails and causing some of it to pass laterally beyond the rails to form the shoulder, and the form of this shoulder is determined by the shape of the shoulder plates 5.

The forward wheels of the truck or car do not revolve, but rest upon the sliding shoes attached to the cross bar, and they form a secure backing for the cross beam, which is firmly sustained under displacement rearwardly. I may employ cross ties or other beams, as at 18, resting upon the cross beam to extend the height of the apparatus in order that it may be pushed effectively against a pile of the ballasting material of considerable height. By the use of the shoes, the wear will be taken from the front wheels, and they will not become flattened by the use of the invention, these wheels simply resting without revolution upon the shoes.

I claim as my invention:—

1. An apparatus for leveling ballast on railways comprising a member extending across the rail and below the same substantially to the surface of the ties and throughout its extent from rail to rail, and means for moving said member to level the ballast, substantially as described.

2. An apparatus for leveling ballast on railways, comprising a member extending across the rails and having end portions conforming in shape to the shoulder desired to be formed on the roadbed, and means for moving said member along the rails, substantially as described.

3. In combination in apparatus of the class described, a cross beam or member having notches to receive the rails and having shoulder forming ends, with means for moving said member along the rails, substantially as described.

4. In combination in apparatus of the class described, a cross beam tapered from the center laterally on its vertical face and having shoulder forming ends, with means for moving the cross beam along the rails, substantially as described.

5. In combination in apparatus of the class described, a cross beam to move along the rails, shoes associated therewith to rest on the rails, and form supports for the forward wheels of the car or, locomotive, substantially as described.

6. In apparatus of the class described, a member to extend across the track, and means for locating said member against the forward wheels of the locomotive or propelling device, substantially as described.

7. In combination in apparatus of the class described, a cross beam, adjustable shoulder forming members at the ends thereof, means for adjustably connecting the said members with the cross beam, and means for propelling the cross beam along the track, substantially as described.

THERON SAMUEL CAFFERTY.

Witnesses:

A. R. Humphrey,

Carrie W. Humphrey.